United States Patent
Ranganathan et al.

(10) Patent No.: US 11,710,145 B2
(45) Date of Patent: Jul. 25, 2023

(54) TRAINING A MACHINE LEARNING ALGORITHM TO CREATE SURVEY QUESTIONS

(71) Applicant: Dell Products L. P., Round Rock, TX (US)

(72) Inventors: Karthik Ranganathan, Round Rock, TX (US); Sathish Kumar Bikumala, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 123 days.

(21) Appl. No.: 17/005,589

(22) Filed: Aug. 28, 2020

(65) Prior Publication Data

US 2022/0067769 A1     Mar. 3, 2022

(51) Int. Cl.

| G06Q 30/02 | (2023.01) |
|---|---|
| G06Q 10/00 | (2023.01) |
| G06N 20/00 | (2019.01) |
| G06Q 10/06 | (2023.01) |
| G06Q 30/0208 | (2023.01) |
| G06Q 10/20 | (2023.01) |
| G06Q 10/0639 | (2023.01) |
| G06Q 10/0633 | (2023.01) |

(52) U.S. Cl.
CPC ......... *G06Q 30/0208* (2013.01); *G06N 20/00* (2019.01); *G06Q 10/0633* (2013.01); *G06Q 10/06398* (2013.01); *G06Q 10/20* (2013.01)

(58) Field of Classification Search
CPC .......... G06Q 30/0208; G06Q 10/0633; G06Q 10/06398; G06Q 10/20; G06N 20/00

USPC ...................................................... 705/14.11
See application file for complete search history.

(56) References Cited

U.S. PATENT DOCUMENTS

2020/0184406 A1* 6/2020 Han ............... G06Q 10/063116

FOREIGN PATENT DOCUMENTS

AU     2014280991 B2 * 11/2015 ......... G06Q 10/0635

OTHER PUBLICATIONS

Trent D. Buskirk, An Introduction to Machine Learning Methods for Survey Researchers, 2018 (Year: 2018).*

* cited by examiner

*Primary Examiner* — Tarek Elchanti
(74) *Attorney, Agent, or Firm* — Krishnendu Gupta; Nikhil Patel

(57) ABSTRACT

In some examples, a server may determine that a case, created to address an issue of a computing device, is closed and perform an analysis of steps in a process used to close the case. The analysis may determine a length of time of each step and determine that a time to close the case or complete a particular step was at least a predetermined amount faster than average. The server may use machine learning to create a survey question to determine a technique used to close the case or complete the particular step faster than average and to determine one or more incentives to provide a technician that closed the case. An answer from the technician to the survey question may include the technique used to close the case or complete the particular step faster than average. The technique may be shared with other technicians.

17 Claims, 7 Drawing Sheets

TRAINING A MACHINE LEARNING ALGORITHM TO CREATE SURVEY QUESTIONS

BACKGROUND OF THE INVENTION

Field of the Invention

This invention relates generally to computing devices and, more particularly to using machine learning to analyze a communication session between a user and a support technician, and creating a survey to determine the techniques used by the support technician.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Companies may conduct a survey after a user has interaction with an agent (e.g., salesperson, technical support specialist, or the like) of the company to determine user satisfaction (and dissatisfaction) with the interaction. However, the questions asked in the survey may be predetermined (e.g., generic) and may not be relevant to the experience of the customer. Moreover, if the agent is able to resolve an issue (e.g., associated with the user's computing device) faster than average, the techniques used by the agent may remain with the agent. For example, the agent may not share the techniques with other agents to enable the agent to outperform the other agents. The tips and tricks used by the agent to resolve issues faster than average may remain known to the agent and may not be known to other agents.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may determine that a case, created to address an issue of a computing device, is closed and perform an analysis of steps in a process used to close the case. The analysis may include determining a length of time of each step and determining that a time to close the case or complete a particular step was at least a predetermined amount faster than average. The server may use machine learning to create a survey question to determine a technique used to close the case or complete the particular step faster than average. The machine learning may determine one or more incentives to provide a technician that closed the case. The survey question and the incentive may be provided to the technician. A survey answer may include the technique used to close the case or complete the particular step faster than average. The technique may be shared with other technicians.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
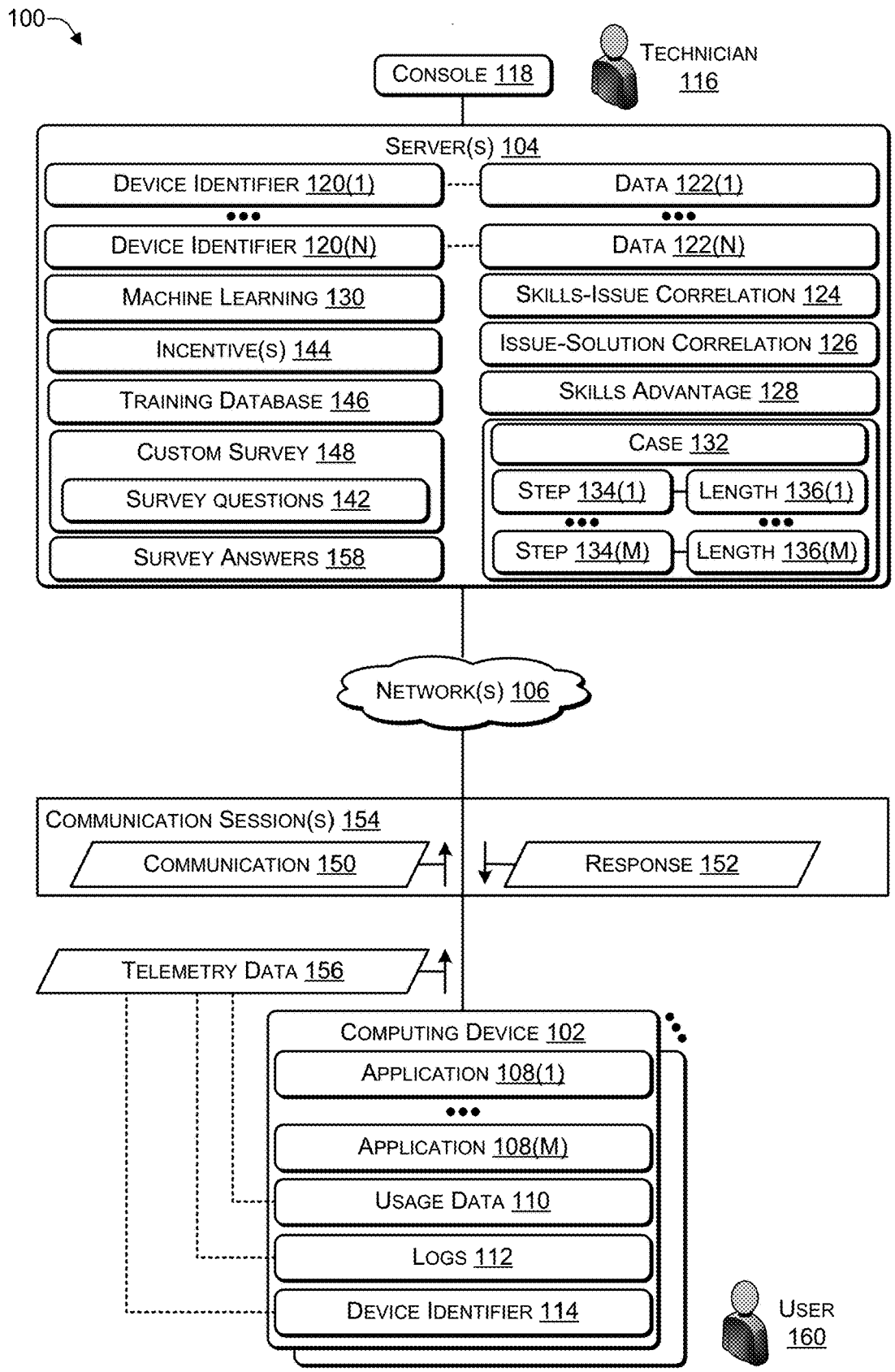
FIG. 1 is a block diagram of a system that includes a computing device initiating a communication session with a server, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system (IHS) may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may provide technical support specialists (also referred to herein as service technicians, support technicians, technicians, or agents) to resolve issues related to devices (e.g., IHS) sold by the computer manufacturer. For example, after a user has purchased a computing device, the user may encounter an issue, such as a hardware issue, a software issue, or both. To resolve the issue, the user may contact (e.g., via email, chat, or a call), a technical support department of the manufacturer. The user may be assigned to a support technician tasked with resolving the issue. After the support technician has resolved the issue, the steps in the process used to resolve the issue may be analyzed using machine learning.

If the technician is able to resolve the issue a predetermined amount (e.g., 5%, 10%, 15%, 20%, or the like) faster than average (e.g., compared to the average time taken to resolve similar issues by other technicians), then machine learning may be used to predict a skills advantage (e.g., tips and tricks the technician uses that other technicians may not use to resolve issues faster than average) of the technician. The machine learning may be used to perform skills-issue correlation to determine, for the issue that was resolved, whether the technician use the same (or similar) skills used by other technicians to solve the same (or similar) issue. For example, a technician can "game the system" by simply recommending a replacement motherboard, replacement device, or the like for every issue. Such approaches may resolve the issue quickly but may be cost prohibitive for the manufacturer. Skills-issue correlation is performed to determine whether the technician solved the issue by accident or by design.

The manufacturer may use skills-issue correlation to determine which particular training is useful and which particular training is not useful. For example, if a technician can resolve an issue without the training that most if not all other technicians have undergone, then that training may not be useful in resolving the issue (or similar issues). If a technician is able to quickly resolve an issue using the same (or similar) solution as other technicians but did not undergo any training regarding the solution while other technicians underwent the training, then the training may be unnecessary or may need to be revised. To determine whether the training provides a benefit to the technician, a custom survey may be created to answer questions such as "You were not trained on this issue but were still able to resolve it quickly. How did you do that?" For example, some types of training (e.g., where a technician follows a script) may result in a step (e.g., troubleshooting) taking a particular amount of time, whereas a technician that did not receive the training (and is not following a script) may resolve the issue faster. To illustrate, based on previous experiences with the same (or similar) products, the technician may bypass multiple steps in the troubleshooting process (e.g., script) to more quickly identify the issue as compared to other technicians who underwent the training and follow a script to troubleshoot.

The manufacturer may use issue-solution correlation to determine whether, for a particular issue, the solution provided by the technician was appropriate. For example, a technician that solves each issue by replacing a device, replacing a motherboard, or replacing another component may quickly resolve the issue but such solutions may be inefficient. As another example, the technician may use a "quick and dirty solution" that is quickly applied but that temporarily addresses the problem (e.g., without addressing the underlying cause), resulting in the user calling customer support days (or weeks) later when the issue returns.

The manufacturer may keep track of training (e.g., certifications) that each technician has undergone but may not track other information sources that the technician gathers information from, such as, for example, talking to other technicians, reading journals, watching online videos, and the like. Thus, a custom survey may ask questions such as "You solved this particular issue quickly but didn't have a related certification—where did you learn about the solution that you used?" After the technician responds to the survey by providing details associated with the solution, the solution details may be circulated to other technicians. If a technician scores high on skills-issue correlation and issue-solution correlation and the technician applied a solution, then a custom survey with custom questions may be created to determine whether training taken by the technician was useful in solving the issue, e.g., the questions may include "You underwent training regarding <issue>. Did you feel this training helped you address the issue?" In this way, training that the technician has taken may be validated. If the technician did not undergo training related to the issue, the survey may include questions such as "You didn't have training regarding <issue>. How were you able to solve it?" The questions in the custom survey may be generated using machine learning.

A particular technician may be reluctant to respond to the custom survey and share the "tips and tricks" that enable them to quickly resolve issues with other technicians as the particular technician may be apprehensive about losing their advantage over the other technicians. For example, if each technician's job performance is measured based in part on how quickly they resolve issues, then the particular technician's tips and tricks may enable the particular technician to be ranked higher than other technicians based on job performance. In such cases, the particular technician may be reluctant to divulge the tips and tricks for fear of negative consequences, such as receiving a poorer job performance evaluation after sharing the tips and tricks and enabling other technicians to resolve issues as fast as the particular technician. Machine learning may be used to predict incentives to offer the technician to reveal the tips and tricks (e.g., techniques). For example, the incentives may include providing the particular technician a cash (or similar) incentive to respond in detail to the survey, expanding the particular technician's job responsibilities to include training other technicians (e.g., improving the skills of other technicians results in a higher job performance rating for the particular technician), and the like. The machine learning may analyze the particular technician's behavior to determine what motivates the particular technician and predict which incentive(s) are likely to cause the particular technician to respond to the survey to disclose the tips and tricks.

If the technician resolves the issue a predetermined amount (e.g., 5%, 10%, 15%, 20%, or the like) slower than average, the machine learning may be used to predict potential pain points. A pain point may be a step or a sub-step that is abnormal, e.g., takes longer than average, involves more transfers (between technicians) than average, or the like. For example, in a particular step, a user may normally be transferred from one technician to another technician an average of 2.2 times. If the user is transferred more than three times, then the particular step may be considered abnormal and therefore a potential pain point. As another example, in a particular step, a technician may normally take five minutes on average to obtain particular information about the user's computing device. If the technician takes more than five minutes, then the particular step may be considered abnormal and therefore a potential pain point. After the potential pain points (e.g., in the process to resolve the issue) have been identified, the machine learning may create a survey, e.g., a custom survey that is customized for this user's particular issue and experience in resolving the particular issue, to verify whether the predicted potential pain points were in fact pain points for the user. For example, based on identifying the potential pain points, the survey questions may include questions asking the user whether the potential pain points were in fact pain points for the user, e.g., whether the user felt that the particular step took too long, whether the user was transferred to many times, or the like. To illustrate, the survey may include a question "Did you find the number of transfers between technicians to be excessive?", "Did you find that the technician took an excessive amount of time to determine the information about the computing device?", or the like. In this way, the survey can ask questions to determine whether the potential pain points are in fact actual pain points, e.g., whether the user found them to be pain points. For example, the user may respond to the questions and indicate that the user did not find the number of transfers between technicians to be excessive or the user did not find the amount of time that the technician used to determine the information about the computing device to be excessive, because the issue was ultimately resolved in a timely manner. In this example, the user's answers to the custom survey questions enable the manufacturer to identify and address steps (or sub-steps) that users find to be actual pain points and to identify steps (or sub-steps) that users do not consider to be pain points and that the manufacturer need not address. In this way, the manufacturer can perform meaningful modifications by addressing the steps (or sub-steps) in the process that users find to be actual pain points.

After a technician has resolved an issue, the server may correlate the solution to the issue and perform an analysis of the steps used in the process to resolve the issue, including performing a skills analysis of each step (or sub-step) in the process. Machine learning may be used to predict which of the technician's skills may be improved, e.g., the technician is taking more time than other technicians take, on average, to perform a particular step (or sub-step). Machine learning may be used to predict which of the technician's skills are above average, e.g., the technician is taking significantly less (e.g., less than a predetermined amount or percentage of) time than other technicians take, on average, to perform a particular step (or sub-step). Machine learning may be used to create a survey for the technician to obtain additional data regarding the skills to improve and the skills in which the technician is above average. For skills that the technician may improve, the technician may be provided with training to improve those skills, including, for example, having a second technician that is about average in those skills train the technician. For skills where the technician is above average, the survey may ask the technician what specific tips and tricks the technician use to perform the step in an above average manner. The tips and tricks may be shared with other technicians to teach the specific techniques (e.g., tips and tricks) used to perform the step (or subset) faster than average. In this way, technicians can be provided targeted training to improve skills where improvement may be possible. In addition, details on how a particular technician is able to complete a step and/or sub-step faster than average may be obtained and shared with other technicians. In some cases, a particular technician who is able to complete a step and/or sub-step faster than average may be asked to instruct other technicians on the techniques the technician uses. Machine learning may be used to determine incentives to encourage a technician to share techniques that enable the technician to complete a step (or substep) faster than average.

Thus, after a user calls technical support with an issue, is connected to a technician, and the technician resolves the issue, the steps and/or sub-steps involved in the process to resolve the issue may be analyzed. Machine learning may be used to identify which steps the technician performed faster than average. The machine learning may perform skills-issue correlation and issue-solution correlation. The machine learning may create custom survey questions for a custom survey that is provided to the technician to identify the techniques the technician used to complete one or more steps (or sub-steps) faster than average. The machine learning may determine, based on the technician's past behavior, incentives to motivate the technician to fully disclose the techniques used to complete one or more steps (or sub-steps) faster than average. The techniques may be used to identify information as to how the technician was above average and disseminate that information to other technicians.

For example, a server may include one or more processors and one or more non-transitory computer-readable media storing instructions executable by the one or more processors to perform various operations. The operations may include determining that a case (e.g., ticket) created to address an issue (e.g., error log, blue screen of death (BSOD), involuntary restart, application crash, or the like) associated with a computing device is closed. The operations may include performing an analysis of a process (e.g., one or more steps a technician performs to address the issue) used to close the case. For example, the analysis may include determining a length of time corresponding to individual steps in the process used to close the case. As another example, the analysis may include determining one or more actions (e.g., troubleshooting actions such as installing new software (e.g., driver, application, operating system or the like), installing new firmware (e.g., device firmware or a basic input output system (BIOS) update), removing a hardware component or a software component, or the like) performed in the individual steps in the process used to close the case. As yet another example, the analysis may include performing skills-issue correlation that includes determining an issue associated with the case, determining one or more skills used to close the case, and determining a correlation between the one or more skills and skills used by the one or more additional technicians to address similar issues. As a further example, the analysis of the process may include performing issue-solution correlation that includes determining an issue associated with the case, determining a solution used to address the issue, and determining an appropriateness of the solution. The operations may include determining, using the machine learning and based at least in part on the analysis, that the case was closed faster than an average case time to close similar cases. For example, determining that the case was closed faster than the average case time to close similar cases may include determining a case time comprising a difference between a first point in time that the case was created to a second point in time that the case was closed, determining the average case time to close the similar cases, and determining that the case time is at least a predetermined percentage (e.g., 5%, 10%, 15%, 20% or the like) less than the average case time. The operations may include generating a custom survey including a question (which may have multiple parts) to determine a technique used to close the case faster than the average case time. The operations may include determining, using the machine learning algorithm and based at least in part on the analysis, that a particular step in the process used to close the case was performed faster than an average step time associated with the particular step and generating, using the machine learning algorithm, a second question (which may have multiple parts) to include in the custom survey to determine a second technique used to perform the step faster than the average step time. The operations may include determining, using the machine learning algorithm, one or more incentives to provide to a technique to respond to the custom survey. For example, the one or more incentives may include at least one of: a cash award, points redeemable for goods or services, or an added responsibility of the technician, where a job performance of the technician is based at least in part on an evaluation of the added responsibility. For example, the job performance of the technician may be evaluated based on the performance of other technicians that the technician is training. The operations may include providing the custom survey to a technician that closed the case faster than the average case time. The operations may include identifying the one or more incentives to the technician. The operations may include receiving an answer corresponding to the question and receiving a second answer corresponding to the second question. For example, the answer may include the technique used to close the case faster than the average case time and the second answer may include the second technique used to perform the step faster than the average step time. The operations may include providing the technique used to close the case faster than the average case time and providing the second technique used to perform the step faster than the average step time to the one or more additional technicians.

FIG. 1 is a block diagram of a system 100 that includes a computing device initiating a communication session with a server, according to some embodiments. The system 100 may include multiple computing devices, such as a representative computing device 102, coupled to one or more servers 104 via one or more networks 106.

The computing device 102 may be a server, a desktop, a laptop, a tablet, a 2-in-1 device (e.g., a tablet can be detached from a base that includes a keyboard and used independently of the base), a smart phone, or the like. The computing device 102 may include multiple applications, such as a software application 108(1) to a software application 108(M). The software applications 108 may include an operating system, device drivers, as well as software applications, such as, for example a productivity suite, a presentation creation application, a drawing application, a photo editing application, or the like. The computing device 102 may gather usage data 110 associated with a usage of the applications 108, such as, for example, which hardware components each application uses, an amount of time each hardware component is used by each application, an amount of computing resources consumed by each application in a particular period of time, and other usage related information associated with the applications 108. The computing device 102 may gather logs 112 associated with the applications 108, such as installation logs, restart logs, memory dumps as a result of an application crash, error logs, and other information created by the applications 108 when the applications 108 and counter a hardware issue or a software issue. The device identifier 114 may be an identifier that uniquely identifies the computing device 102 from other computing devices. For example, the device identifier 114 may be a serial number, a service tag, a media access control (MAC) address, or another type of unique identifier. The computing device 102 may periodically or in response to a predefined set of events occurring within a predetermined period of time send telemetry data 156 to the server 104, where the telemetry data 156 includes the usage data 110, the logs 112, and the device identifier 114. For example, the predefined set of events occurring within a predetermined period of time may include a number of restarts (e.g., X restarts, where X>0) of an operating system occurring within a predetermined period of time (e.g., Y minutes, where Y>0), a number (e.g., X) of application error logs or restart logs occurring within a predetermined period of time (e.g., Y), or the like.

The server 104 may include one or more servers that execute multiple applications across the multiple servers and behave as a single server. Multiple technicians, such as a representative technician 116 (e.g., also known as a technical support specialist or agent), may access the server 104 via one or more consoles, such as a representative console 118.

The server 104 may store the telemetry data 156 in a database in which a device identifier 120 is associated with data 122. For example, a device identifier 120(1) may be associated with data 122(1) and a device identifier 120(N) may be associated with data 122(N). In this example, the device identifier 114 may be one of the device identifiers 120(1) to (N). The data 122 may include historical (e.g., previously received) telemetry data, historical (e.g., previously received) service requests (e.g., previous cases associated with the computing device 102), warranty data, and other related data.

The server 104 may include one or more machine learning algorithms, such as a representative machine learning 130. The machine learning 130 may include one or more types of supervised learning, such as, for example, Support Vector Machines (SVM), linear regression, logistic regression, naive Bayes, linear discriminant analysis, decision trees, k-nearest neighbor algorithm, Neural Networks such as Multilayer perceptron or similarity learning, or the like.

A user 160 may be associated with and use the computing device 102. When the user 160 encounters an issue with the computing device 102, the user may initiate a communication 150 to the server 104 and be routed to the technician 116. The technician 116 may provide a response 152 to the communication 150 thereby creating a communication session 154 in which the user 160 sends one or more communications (such as the representative communication 150) to the technician 116 and the technician 116 provides one or more responses (such as the representative response 152).

In response to the user 160 initiating the communication 150, the technician 116 may create a case 132 (also referred to as a trouble ticket or a ticket) associated with the issue. The technician 116 may perform a series of steps 134, such as a step 134(1) to a step 134(M) (M>0) to resolve the issue and close the case 132. Each of the steps 134 may include zero or more sub-steps, as explained further in FIG. 2. Each step 134 may have a corresponding length 136 indicating how much time was spent on each step 134. For example, the step 134(1) may have a length 136(1) and the step 134(M) may have a length 136(M).

After the case 132 has been closed (e.g., the issue has been resolved), the machine learning 130 may perform an analysis of the steps 134 associated with the case 132. For example, the steps 134 may include steps (and sub-steps) taken by the technician 116 to resolve the issue and close the case 132.

The communication session 154 may be in the form of voice communication (e.g., phone call, voice over internet protocol (VoIP) call, or the like), video communication (e.g., Skype®, Zoom®, Facetime®, or the like), chat communication (e.g., ZenDesk or the like), email communication, another type of communication, or any combination thereof.

The machine learning 130 may analyze the steps 134, including the length 136 of each of the steps 134, to determine which of the steps 134 were performed faster than average. The average of each step 134 may be determined based on averaging how long each step 134 took technicians (e.g., the technician 116 and other technicians) to perform in the past. The machine learning 130 may identify a subset of the steps 134 that the technician 116 performed faster than average. In some cases, the machine learning 130 may identify a subset of the steps 134 that were performed a predetermined amount (e.g., 5 minutes) or a predetermined percentage (e.g., X % where X=5%, 10%, 15%, 20% or the like) faster than average. For example, if step 134(M) was performed in a length of time 136(M) of 10 minutes, then step 134(M) may be selected as being performed faster than average if the length of time 136(M) is at least 10% (e.g., X=10) less than average, e.g., 9 minutes or less. The step 134(M) may not be selected if the length of time 136(M) is not at least 10% less than average, e.g., step 134(M) is not selected if greater than 9 minutes. In this way, a subset of the steps 134 is selected where the technician 116 performed a particular step significantly (e.g., at least X %) faster than average.

If the technician 116 is able to resolve the case 132 and/or a subset of the steps 134 significantly (e.g., at least X %) faster, then machine learning 130 may be used to predict a skills advantage 128 (e.g., tips and tricks the technician 116 uses that other technicians may not use to resolve issues faster than average). The machine learning 130 may be used to perform a skills-issue correlation 124 to determine, for the case 132 and/or the subset of the steps 134 performed significantly faster than average, whether the technician 116 uses the same (or similar) skills used by other technicians to solve the same (or similar) issue. For example, a technician can recommend a replacement motherboard, a replacement device, or the like for every issue. Such approaches may resolve the issue quickly but may be cost prohibitive for the manufacturer. Skills-issue correlation 124 may be performed to determine whether the technician 116 solved the issue by accident or by design (e.g., using a prescribed approach).

The skills-issue correlation 124 may be used to determine which particular training that the technician 116 received is useful and which particular training is not useful to resolve the case 132 and/or the steps 134. For example, if the technician 116 is able to resolve the case 132 and/or one or more of the steps 134 without the particular training that many other technicians have undergone, then that particular training may not be useful. If the technician 116 is able to quickly resolve the case 132 and/or one or more of the steps 134 using the same (or similar) techniques as other technicians but did not undergo any training regarding the techniques while other technicians underwent the training, then the training may be unnecessary or may need to be revised. To determine whether a particular training (e.g., certification) provides a benefit to the technician 116, the machine learning 130 may create a custom survey 148 with survey questions 142 such as "You were not trained on this issue but were still able to resolve it quickly. How did you do that?" For example, some types of training (e.g., where a technician follows a script) may result in a step (e.g., troubleshooting) taking a particular amount of time, whereas another technician that did not receive the training (and is not following a script) may resolve the issue faster. To illustrate, based on previous experiences with the same (or similar) products, the technician 116 may bypass multiple steps in the troubleshooting process (e.g., included in the script) to more quickly identify and/or resolve the issue as compared to other technicians who underwent the training and follow a script to troubleshoot.

The server 104 may perform issue-solution correlation 126 to determine whether, for a particular issue (e.g., associated with the case 132), the solution was appropriate. For example, the technician 116 may solve each issue by replacing the computing device, replacing a motherboard of the device, or replacing another component, thereby resolving the issue quickly but inefficiently (e.g., at a higher cost). As another example, the technician 116 may use a "quick and dirty solution" that is quickly applied but that temporarily addresses the problem (e.g., without addressing the underlying cause), resulting in the user 160 calling customer support several days (or weeks) later when the issue returns.

A training database 146 may keep track of training (e.g., certifications, courses, and the like) that each technician (such as the representative technician 116) has undergone but may not track other information sources that the technician gathers information from, such as, for example, talking to other technicians, reading journals, watching online videos, participating in online forums, and the like. Thus, the custom survey 148 may include survey questions 142 such as "You solved this particular issue quickly but didn't have a related certification—where did you learn about the solution that you used?" The technician 116 may respond to the survey 148 by providing survey answers 158 that provide details associated with the solution, techniques, methods, and the like used to close the case 132 and/or one of the steps 134 quickly. The details of the solution, techniques, methods provided in the survey answers 158 may be provided to other technicians. In this way, all technicians benefit when a particular technician discovers a faster way to perform one of the steps 134 and/or close the case 132, resulting in faster resolution of cases and increased customer satisfaction.

If the technician 116 scores high on the skills-issue correlation 124 and the issue-solution correlation 126, then the machine learning 130 may create the custom survey 148 to determine whether training taken by the technician 116 was useful in solving the case 132, e.g., the survey questions 142 may include "You underwent training regarding <issue>. Did you feel this training helped you address the issue?" In this way, training that the technician 116 has taken may be validated. If the technician 116 did not undergo training related to the issue, the survey questions 142 may include questions such as "You didn't have training regarding <issue>. How were you able to solve it?"

In some cases, the technician 116 may be reluctant to respond to the custom survey 148 and share the techniques (e.g., tips and tricks that enable the technician 116 to quickly resolve issues) with other technicians as the technician 116 may be apprehensive about losing their performance advantage over the other technicians. For example, if each technician's job performance is measured based in part on how quickly each technician resolves cases, then the techniques used by the technician 116 may enable the technician 116 to be ranked higher than other technicians because the technician 116 is able to resolve cases faster than the other technicians. In such cases, the technician 116 may be reluctant to divulge the issue solving techniques for fear of negative consequences, such as receiving a poorer job performance evaluation by sharing the techniques and enabling other technicians to resolve issues as fast (or almost as fast) as the technician 116. The machine learning 130 may be used to predict incentives 144 to offer the technician 144 to reveal the tips and tricks (e.g., techniques). For example, the incentives 144 may include providing the technician 116 a cash award (or equivalent such as redeemable points, gift card, or the like) to provide detailed survey answers 158, expanding job responsibilities of the technician 116 to include training other technicians (e.g., improving the skills of other technicians results in a higher job performance rating for the particular technician), and the like. To illustrate, the job performance of the technician 116 may be based on an average time to resolve a case of a group of technicians that are being trained by the technician 116. The machine learning 130 may analyze the behavior of the technician 116 to determine what motivates the technician 116 and predict the incentive(s) 144 that are likely to motivate the technician 116 to provide details of the techniques (e.g., tips and tricks) in the survey answers 158.

The server 104 may create a custom survey 148 and provide the incentive(s) 144 predicted by the machine learning 130 to the technician 116. In some cases, the server 104 may retrieve one or more previously created questions from a survey questions database and modify at least one of the previously created survey questions for inclusion in the custom survey 148. The purpose of the custom survey 148 and the incentives 144 is to encourage the technician 116 to disclose, in the survey answers 158, the particular techniques (e.g., tips and tricks) that the technician 116 used to close the case 132 faster than average and/or perform one or more of the steps 134 faster than average. By obtaining the particular techniques from the technician 116 using the custom survey 148, the manufacturer (of the computing device 102) can share the particular techniques with other technicians to reduce the time taken by the other technicians to (i) close a particular case and/or (ii) perform one or more of the steps 134. In this way, when a technician identifies a technique to quickly resolve a particular issue, that technique can be quickly disseminated to other technicians to enable them to quickly resolve the same or similar issues, thereby improving customer satisfaction.

The custom survey 148 may be presented to the technician using (i) a web-based survey (e.g., hypertext markup language (HTML), extended markup language (XML), or similar), (ii) an interactive voice response (IVR) system that uses voice prompts provide the custom survey 148 and voice recognition to receive the survey answers 158, or another type of survey system.

The skills advantage 128 may identify skills for which the technician 116 has a skills advantage as compared to other technicians. For example, if the technician 116 spends less time (e.g., less than a predetermined amount or a predetermined percentage) than average to perform a particular step of the steps 134, then the particular step is likely to indicate an area where the technician 116 has a skill advantage. In such cases, the technician 116 may be given the custom survey 148 to provide information as to how the technician 116 was able to spend less time than average on the particular step. For example, the technician 116 may have developed a shortcut to troubleshoot a particular issue. By identifying that the technician 116 is able to troubleshoot the particular issue in a shorter than average period of time, the technician may be asked to share the shortcut or other tips and tricks with other technicians to help improve the time to close a case.

The custom survey 148 may ask which particular set of actions the technician performed at a particular step of the steps 134 to enable the technician 116 to quickly complete the particular step and why the technician 116 performed the particular set of actions. In this way, this custom survey 148 may identify shortcuts or other faster ways of performing a step (e.g., a tip, a trick, or other technique) that the technician 116 uses to quickly complete the particular step. These faster ways of performing the particular step may be shared with other technicians to improve the time other technicians spend to complete the particular step. For example, the faster ways of performing the particular step may be incorporated into a training course, the technician 116 may be asked to train other technicians, or the like.

The machine learning 130 may be periodically retrained using the survey answers 158, the skills-issue correlation 124, the issue-solution correlation 126, the skills advantage 128, or any combination thereof. For example, after a case, such as the representative case 132, has been closed and the survey answers 158 to the custom survey 148 received, the survey answers 158, the skills-issue correlation 124, the issue-solution correlation 126, and the skills advantage 128, or any combination thereof, may be used to retrain the machine learning 130 to improve an accuracy of the machine learning 130.

Thus, when a user discovers an issue with the computing device, the user may contact a support department of the manufacturer of the computing device and be placed in contact with a technician. The user and the technician may participate in a communication session in which the technician obtains information from the user regarding the issue and performs one or more actions (e.g., install a software update, install a driver update, install a BIOS update, install an operating system update, install a firmware update, install another type of update, or any combination thereof) to the computing device to resolve the issue and close the case. For example, the technician may remotely connect to the computing device to perform the one or more actions. After the case has been closed, machine learning may be used to analyze the case (e.g., identify the primary issue and any secondary issues), the steps used to resolve the case, what was performed in each step, a length of time to perform each step, and other information related to the case. The machine learning may determine whether the technician was able to close the case at least a predetermined percentage faster than average and/or perform one or more of the steps faster than average. For example, in some cases, the technician may perform each step slightly faster than average, such that the cumulative amount of time to close the case is at least a predetermined percentage below average. As another example, the technician may perform one or more steps significantly faster than average and one or more steps slower than average, resulting in the technician resolving the case in an average amount of time. In such cases, the technician may be provided training to improve the one or more steps that were performed slower than average while the techniques the technician used to perform one or more steps faster than average may be shared with other technicians. Machine learning may be used to create questions in a custom survey and to predict incentives to provide the technician to fully disclose the technician's techniques. The custom survey may determine more information about what particular actions the technician took to perform a particular step faster than other technicians (on average) and why the technician took the particular actions. The answers to these questions may be used to train other technicians to perform the particular step faster. In this way, machine learning may be used to analyze how the case was closed and create a custom survey for the technician that closed the case to determine whether the technician has developed a faster way of performing a particular step that can be shared with the other technicians to improve the speed at which the particular step is performed.

Figure 2:
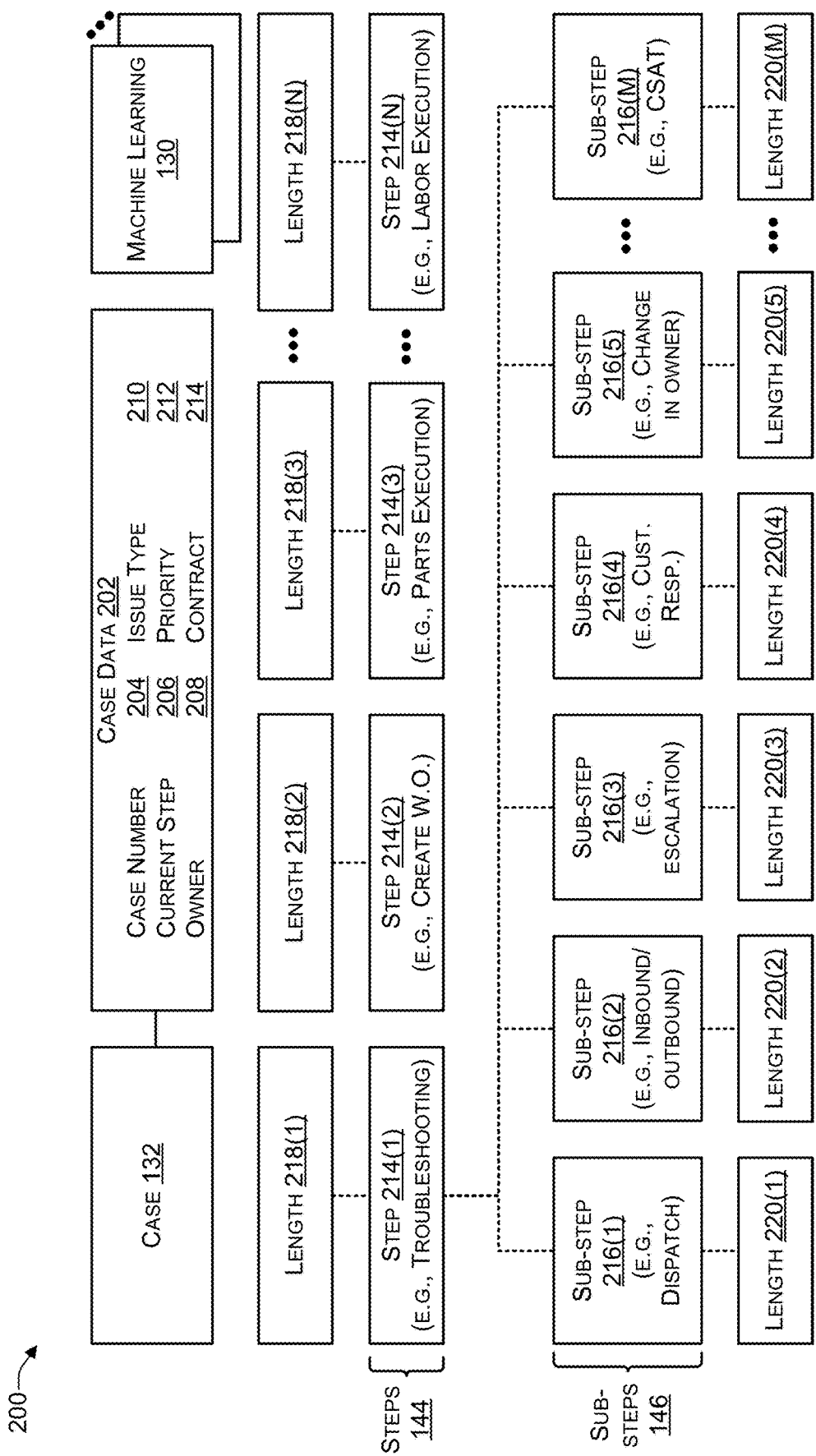
FIG. 2 is a block diagram of a case that includes steps and sub-steps associated with closing the case, according to some embodiments.

FIG. 2 is a block diagram 200 of a case that includes steps and sub-steps associated with closing a case, according to some embodiments. A case, such as the representative case 132, may have associated case data 202. The case data 202 may include information about the case such as, for example, a case number 204, a current step 206, an owner 208, an issue type 210, a priority 212, and a contract 214. The case number 204 may be an alphanumeric number assigned to the case 132 to uniquely identify the case 132 from other cases. The current step 206 may indicate at what stage (e.g., a particular step and/or sub-step) the case 132 is in the current process. The owner 208 may indicate a current technician (e.g., the technician 116 of FIG. 1) to which the case 132 is assigned. The issue type 210 may indicate a type of issue determined by the technician based on the initial troubleshooting. For example, the issue type 210 may be software, hardware, firmware, or any combination thereof. The priority 212 may indicate a priority level associated with the case 132. For example, if the user is a consumer that has paid for a higher-level support plan or a higher-level warranty or if the user is part of an enterprise that is one of the top customers (e.g., buying hundreds of thousands of dollars' worth of products and support each year) of the computer manufacturer and has purchased a high level support plan, then the priority 212 may be higher compared to other users. As another example, if the time to resolve the case 132 has exceeded a particular threshold, then the priority 212 may be automatically escalated to a next higher priority level to maintain or increase customer satisfaction. The contract 214 may indicate a current warranty contract between the user and the manufacturer. For example, the contract 214 may indicate that the contract is a standard contract provided to a purchaser of the computing device. As another example, the contract 214 may indicate that the contract is a higher-level warranty (e.g., Support Pro, Silver, or the like) or a highest-level warranty (e.g., Support Pro Plus, Gold, or the like).

The process to close the case 132 may include multiple steps, such as a step 214(1) (e.g., troubleshooting), a step 214(2) (e.g., create a work order (W.O.)), a step 214(3) (e.g., parts execution), to a step 214(N) (e.g., labor execution, N>0). One or more of the steps 214 may include one or more sub-steps. For example, as illustrated in FIG. 2, the step 214(1) may include sub-steps 216(1) (e.g., dispatch part(s)), 216(2) (e.g., receive inbound communication), 216(3) (e.g., escalate to a higher-level technician or to a manager), 216(4) (e.g., customer responsiveness), 216(5) (e.g., change in ownership), to 216(M) (e.g., customer satisfaction, M>0). Of course, other steps of the steps 214 may also include sub-steps. The steps 214 may correspond to the steps 134 of FIG. 1. The length 218 may indicate a length of time to complete each step. For example, a length 218(1) may indicate a length of time to complete the step 214(1), a length 218(2) may indicate a length of time to complete the step 214(2), a length 218(3) may indicate a length of time to complete the step 214(3), and a length 218(N) may indicate a length of time to complete the step 214(N) (N>0). A length 220(1) may indicate a length of time to complete the sub-step 216(1), a length 220(2) may indicate a length of time to complete the sub-step 216(2), a length 220(3) may indicate a length of time to complete the sub-step 216(3), and a length 220(M) may indicate a length of time to complete the sub-step 216(M) (M>0, M not necessarily equal to N).

Figure 3:
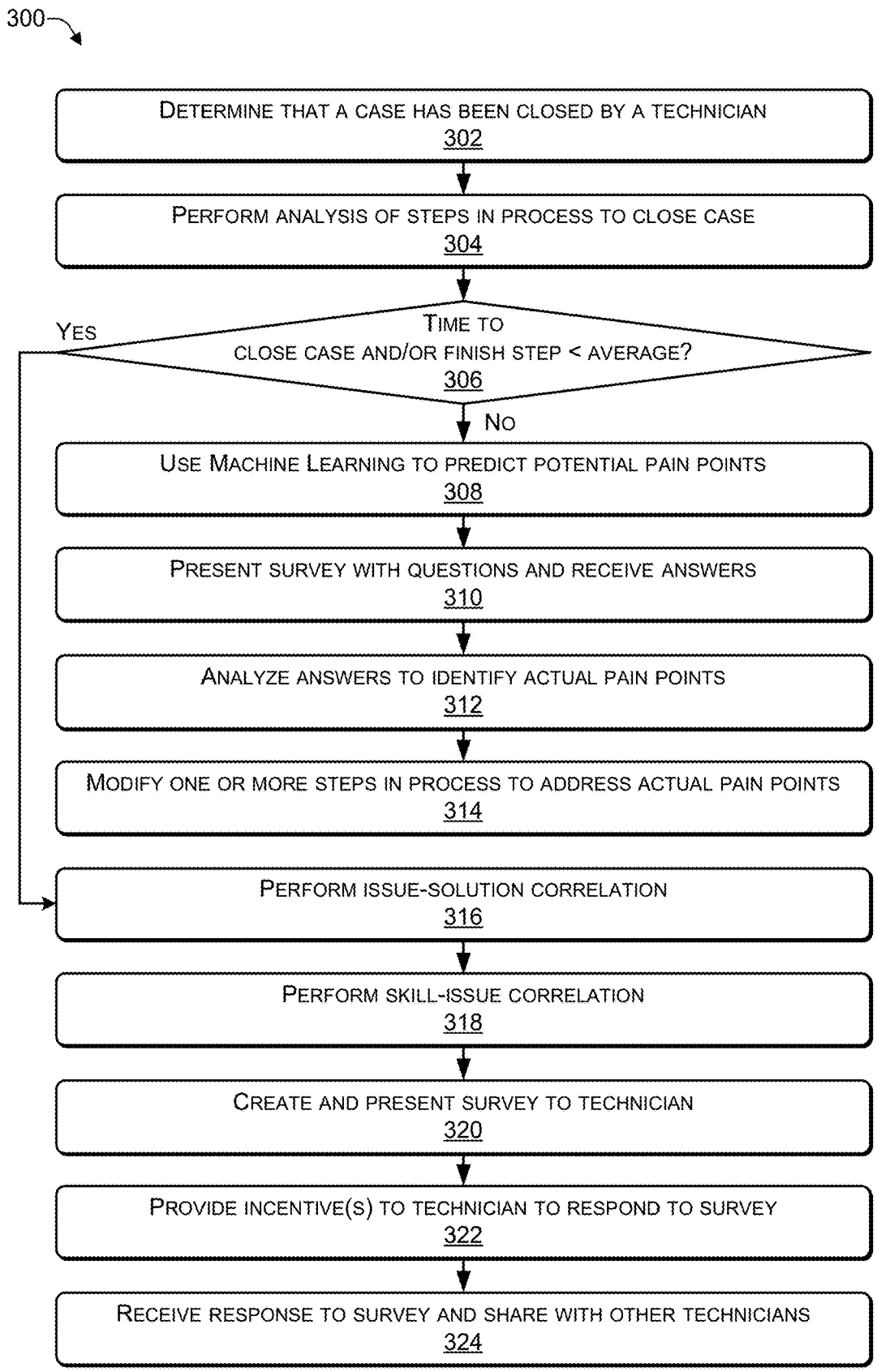
FIG. 3 is a flowchart of a process that includes using machine learning to create a survey for presentation to a technician, according to some embodiments.
Figure 4:
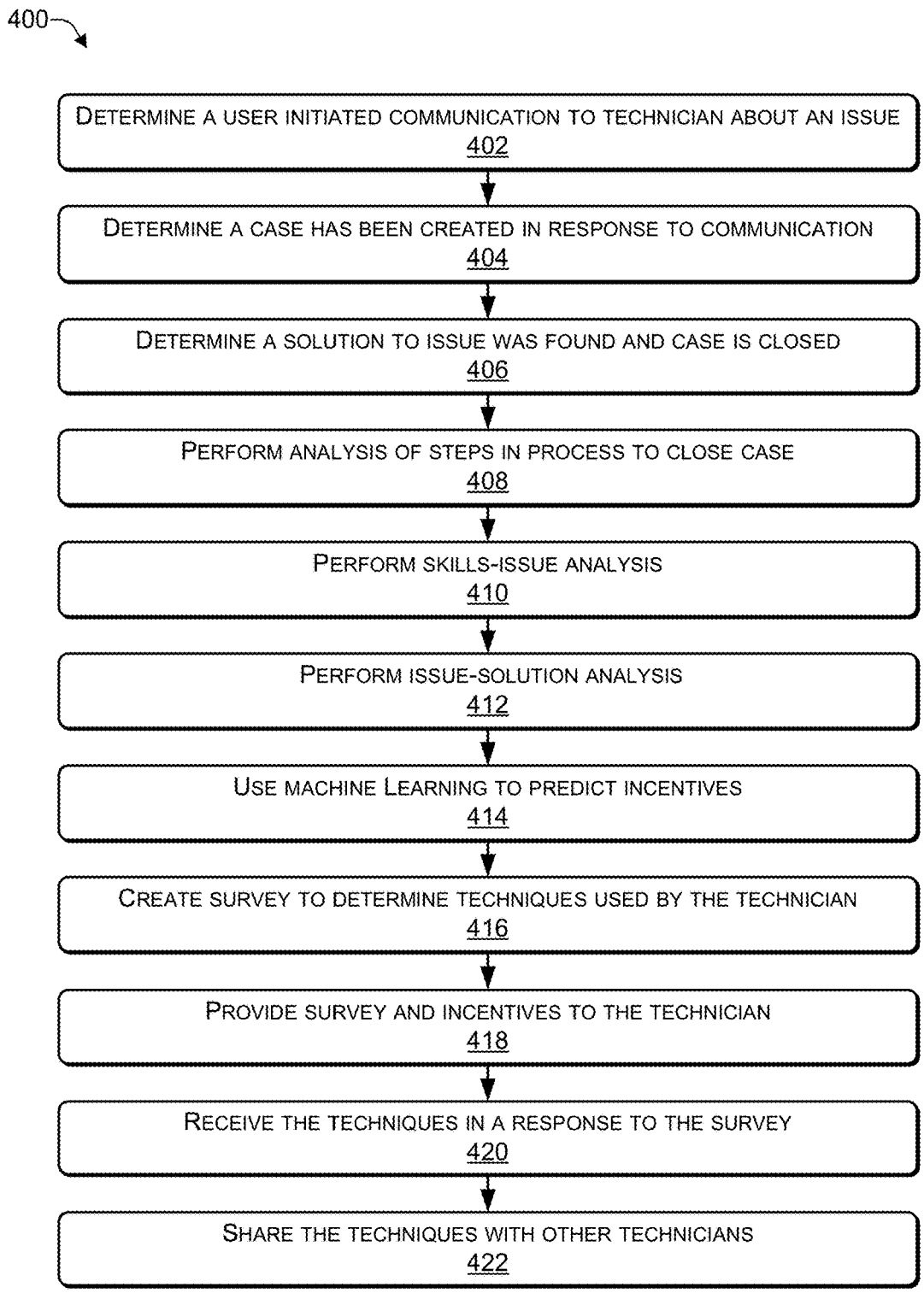
FIG. 4 is a flowchart of a process that includes using machine learning to determine incentives to provide a technician to respond to a survey, according to some embodiments.
Figure 5:
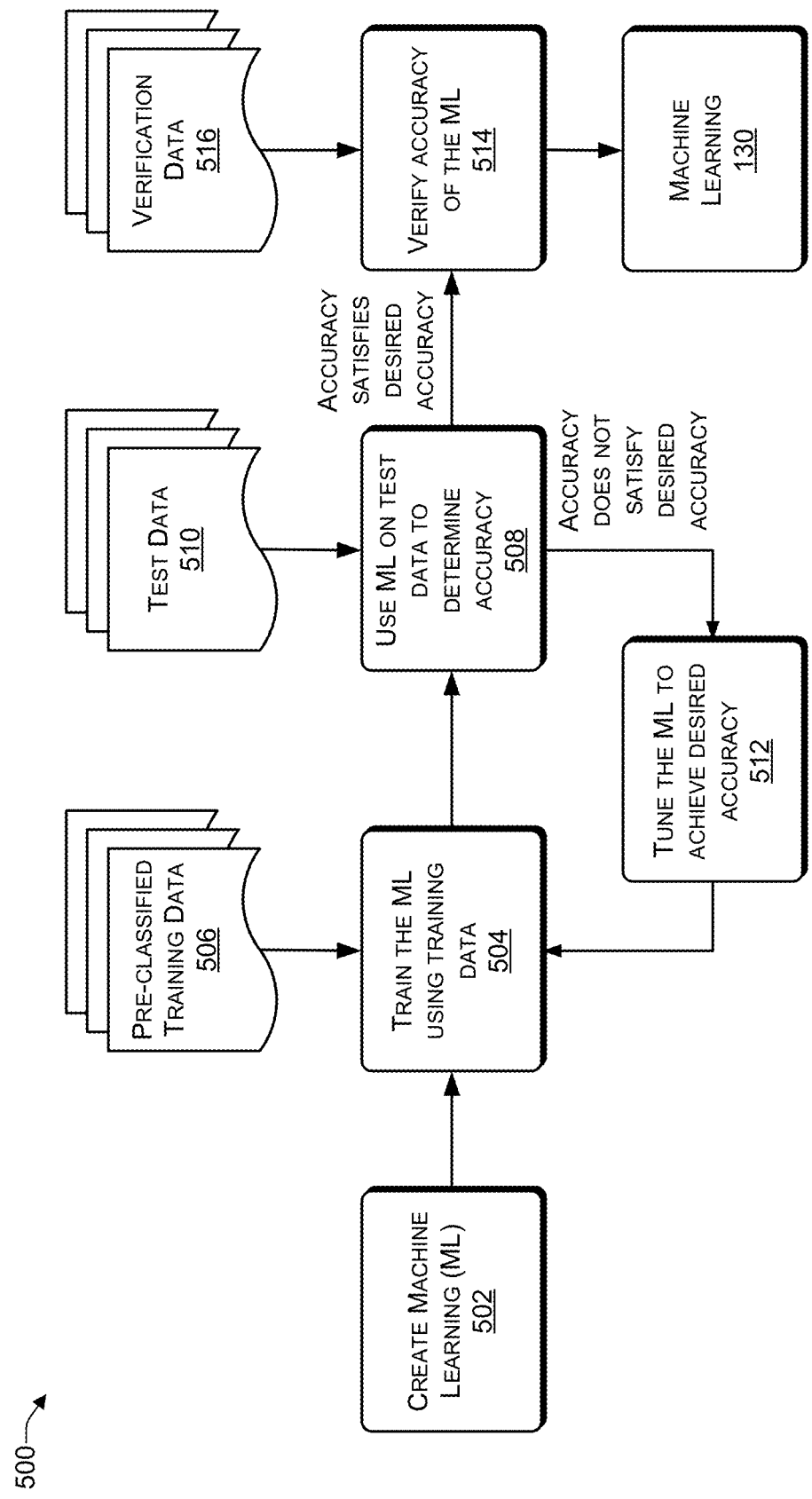
FIG. 5 is a flowchart of a process to train a machine learning algorithm, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400 and 500 are described with reference to FIGS. 1 and 2 as described above, although other models, frameworks, systems and environments may be used to implement this process.

FIG. 3 is a flowchart of a process 300 that includes using machine learning to create a survey for presentation to a technician, according to some embodiments. The process 300 may be performed by a server, such as the server 104 of FIG. 1.

At 302, the process may determine that a case is closed. For example, in FIG. 1, the server 104 may receive the communication 150 from the user 160 indicating an issue with the computing device 102. In response, the server 104 may connect the user 160 to the technician 116 and the technician 116 may provide the response 152. The technician 116 may create the case 132 associated with the issue with the computing device 102. The communication session 154 may include multiple responses 152 from the technician 116 and multiple communications 150 from the user 160. For example, in the communication session 154, the technician 116 may ask the user 160 to provide information about the computing device 102 and the issue being experienced. The technician 116 may ask the user 160 to perform various actions, such as installing and/or uninstalling a software application (e.g., operating system, driver, firmware, software application, or the like), performing a restart, describing what the computing device 102 is displaying, and the like. In some cases, the technician 116 may electronically connect directly to the computing device 102 and perform one or more actions to address the issue. After the technician 116 has successfully resolved the issue, the technician 116 may close the case 132.

At 304, the process may perform an analysis of steps in a process used to close the case. For example, in FIG. 1, the process may perform an analysis to determine the length 136 corresponding to each of the steps 134 and to determine whether the length 136 was more than or less than a predetermined percentage (e.g., 5%, 10%, 15%, or the like) compared to an average length of time to complete each of the steps 134. The process may determine whether a total time period, from when the case 132 was created to when the case 132 was closed, is above average or below average and by what amount and by what percentage.

At 306, the process may determine whether a time to close the case or complete a particular step was less than average (e.g., by at least a predetermined percentage or amount). In response to determining at 306, that "no" the time to close the case or finish a particular step was not less than average, the process may proceed to 308 to predict potential pain points. For example, in FIG. 1, if the communication session 154 is a video call or an audio call, the server 104 may extract the audio portion of the communication session 154 and perform natural language processing, including speech-to-text to extract text from the communication session 154. If the communication session 154 is in the form of one or more chat sessions, an exchange of emails, or another type of text-based communication, then the server 104 may gather the text associated with the communication session. The natural language processing may determine particular words or phrases in the text that are used to indicate a potential pain point, such as the use of four-letter words or other swear words, particular nouns, particular verbs, particular adjectives, particular adverbs, or the like. The natural language processing may perform a voice analysis to determine which words the user 160 emphasizes. For example, the user 160 may emphasize a particular word or phrase by speaking the particular word or phrase at a higher volume as compared to other words or phrases, speaking the particular word or phrase at a higher pitch as compared to other words or phrases, or a combination of both higher volume and higher pitch. To illustrate, particular words or phrases that are spoken at a higher volume and/or pitch may be indicative of potential pain points. The process may perform an analysis to determine the length 136 corresponding to each of the steps 134 and to determine whether the length 136 was more than or less than a predetermined percentage (e.g., 5%, 10%, 15%, or the like) compared to an average length of time to complete each of the steps 134. If the time to close the case and/or complete one or more of the steps 134 was average or greater than average, then the machine learning 130 may predict potential pain points for the user 160 during the resolution of the case 132.

At 310, the process may present a survey to a user with questions associated with the predicted potential pain points and receive answers from the user in response to presenting the survey. At 312, the process may analyze the answers to identify actual pain points. At 314, the process may modify one or more steps in the process to close a case to address the actual pain points. For example, the answers may be correlated with the potential pain points to determine the actual pain points. After the machine learning 130 has created questions to verify whether the predicted pain points were experienced as actual pain points by the user 160, the questions may be included in a survey and presented to the user 160. For example, a particular step of the steps 134 may have taken 20% longer than average and the user 160 may indicate in the survey response that the particular step was not a pain point because the additional time spent on the particular step enabled the issue to be resolved quickly and to the user's satisfaction. As another example, the user 160 may have been transferred multiple times between multiple technicians in a particular step of the steps and the user 160 may indicate in the survey response that the particular step was not a pain point because the multiple transfers enabled the issue to be resolved quickly and to the user's satisfaction. As yet another example, the user 160 may have uttered a word or phrase at a higher volume and/or pitch indicating a potential pain point in a particular step and the user 160 may confirm in the survey response that the particular step was a pain point, even though the particular step took less time than average. In this example, the particular step may have involved the user 160 performing one or more actions to the computing device 102. To address this pain point, the particular step may be modified to have the technician 116 connect to the computing device 102 and perform the one or more actions rather than asking the user 160 to perform the one or more actions. In this way, the manufacturer of the computing device 102 is able to determine actual pain points experienced by the user 160 and address them to increase customer satisfaction with the issue resolution process.

In response to determining at 306, that "yes" the time to close the case or finish a particular step was (a predetermined percentage/amount) less than average, the process may proceed to 316. At 316, the process may perform issue-solution correlation. At 318, the process may perform skill-issue correlation. For example, in FIG. 1, the machine learning 130 may perform the skills-issue correlation 124 to determine, for the case 132 and/or the subset of the steps 134 performed significantly faster than average, whether the technician 116 uses the same (or similar) skills used by other technicians to solve the same (or similar) issue. Skills-issue correlation 124 may determine whether the technician 116 solved the issue by accident or by design (e.g., using a prescribed approach). The server 104 may perform the skills-issue correlation 124 to determine which particular training the technician 116 received is useful and which particular training is not useful to resolve the case 132 and/or the steps 134. For example, if the technician 116 is able to resolve the case 132 and/or one or more of the steps 134 without the particular training that many other technicians have undergone, then that particular training may not be useful. If the technician 116 is able to quickly resolve the case 132 and/or one or more of the steps 134 using the same (or similar) techniques as other technicians but did not undergo any training regarding the techniques while other technicians underwent the training, then the training may be unnecessary or may need to be revised. To determine whether a particular training (e.g., certification) provides a benefit to the technician 116, the machine learning 130 may create a custom survey 148 with survey questions 142 such as "You were not trained on this issue but were still able to resolve it quickly. How did you do that?" For example, some types of training (e.g., where a technician follows a script) may result in a step (e.g., troubleshooting) taking a particular amount of time, whereas another technician that did not receive the training (and is not following a script) may resolve the issue faster. To illustrate, based on previous experiences with the same (or similar) products, the technician 116 may bypass multiple steps in the troubleshooting process (e.g., included in the script) to more quickly identify and/or resolve the issue as compared to other technicians who underwent the training and follow a script to troubleshoot. The server 104 may perform issue-solution correlation 126 to determine whether, for a particular issue (e.g., associated with the case 132), the solution was appropriate. For example, the technician 116 may solve each issue by replacing the computing device, replacing a motherboard of the device, or replacing another component, thereby resolving the issue quickly but inefficiently (e.g., at a higher cost). As another example, the technician 116 may use a "quick and dirty solution" that is quickly applied but that temporarily addresses the problem (e.g., without addressing the underlying cause), resulting in the user 160 calling customer support several days (or weeks) later when the issue returns.

At 320, the process may create and present a custom survey to an agent. At 322, the process may determine and provide one or more incentives to the agent to respond to the custom survey. At 324, the process may receive a response to the survey and share the information gathered in the response with other technicians. For example, in FIG. 1, if the technician 116 resolves the case 132 and/or one or more of the steps 134 at least a predetermined amount or percentage faster than average, then the machine learning 130 may create the custom survey 148 to determine what techniques the technician 116 used. The technician 116 may be reluctant to respond to the custom survey 148 and share the techniques (e.g., tips and tricks) that enable the technician 116 to quickly resolve issues) with other technicians as the technician 116 may be apprehensive about losing their performance advantage over the other technicians. The machine learning 130 may be used to predict incentives 144 to offer the technician 144 to reveal the tips and tricks (e.g., techniques). For example, the incentives 144 may include providing the technician 116 a cash award (or equivalent such as redeemable points, gift card, or the like) to provide detailed survey answers 158, expanding job responsibilities of the technician 116 to include training other technicians (e.g., improving the skills of other technicians results in a higher job performance rating for the particular technician), and the like. The machine learning 130 may analyze the behavior of the technician 116 to determine what motivates the technician 116 and predict the incentive(s) 144 that are likely to motivate the technician 116 to provide details of the techniques (e.g., tips and tricks) in the survey answers 158. The server 104 may create and present the custom survey 148 and provide the incentive(s) 144 predicted by the machine learning 130 to the technician 116. The purpose of the custom survey 148 and the incentives 144 is to encourage the technician 116 to disclose, in the survey answers 158, the particular techniques (e.g., tips and tricks) that the technician 116 used to close the case 132 faster than average and/or perform one or more of the steps 134 faster than average. By obtaining the particular techniques from the technician 116 using the custom survey 148, the manufacturer (of the computing device 102) can share the particular techniques with other technicians to reduce the time taken by the other technicians to (i) close a particular case and/or (ii) perform one or more of the steps 134. In this way, when a technician identifies a technique to quickly resolve a particular issue, that technique can be quickly disseminated to other technicians to enable them to quickly resolve the same or similar issues, thereby improving customer satisfaction.

Thus, a server may determine when a case associated with a computing device has been closed. The server may analyze the steps used to close the case and determine whether the time taken to close the case and/or complete one or more of the steps is a predetermined percentage/amount below average. If so, the machine learning may be used to create a custom survey to determine techniques the technician used to achieve the faster closing of the case and/or completing one or more steps. The machine learning may provide incentives to motivate the technician to share the techniques. After the technician has shared the techniques, the techniques may be shared with other technicians.

FIG. 4 is a flowchart of a process 400 that includes using machine learning to determine incentives to provide a technician to respond to a survey, according to some embodiments. The process 400 may be performed by the server 104 of FIG. 1.

At 402, the process may determine that a user initiated communication with the technician regarding an issue. At 404, the process may determine that a case has been created in response the communication. At 406, the process may determine that a solution to an issue was found and the case closed. For example, in FIG. 1, the server 104 may determine that the case 132 has been created in response to the user 160 initiating the communication 150. The server 104 may determine (e.g., at a later point in time) that the technician 116 found a solution to the issue and was able to close the case 132.

At 408, the process may perform an analysis of steps in a process to close the case. At 410, the process may perform a skills issue analysis. At 412, the process may perform issue solution analysis. For example, in FIG. 1, the machine learning 130 may analyze the steps 134, including the length 136 of each of the steps 134, to determine which of the steps 134 were performed faster than average. The average of each step 134 may be determined based on averaging how long each step 134 took technicians (e.g., the technician 116 and other technicians) to perform in the past. The machine learning 130 may identify a subset of the steps 134 that the technician 116 performed faster than average. In some cases, the machine learning 130 may identify a subset of the steps 134 that were performed a predetermined amount (e.g., 5 minutes) or a predetermined percentage (e.g., X % where X=5%, 10%, 15%, 20% or the like) faster than average. If the technician 116 is able to resolve the case 132 and/or a subset of the steps 134 significantly (e.g., at least X %) faster than average, then machine learning 130 may be used to predict a skills advantage 128 (e.g., tips and tricks the technician 116 uses that other technicians may not use to resolve issues faster than average). The machine learning 130 may be used to perform a skills-issue correlation 124 to determine, for the case 132 and/or the subset of the steps 134 performed significantly faster than average, whether the technician 116 uses the same (or similar) skills used by other technicians to solve the same (or similar) issue. Skills-issue correlation 124 may be performed to determine whether the technician 116 solved the issue by accident or by design (e.g., using a prescribed approach). The server 104 may perform issue-solution correlation 126 to determine whether, for a particular issue (e.g., associated with the case 132), the solution was appropriate.

At 414, the process may use machine learning to predict incentives. At 416, the process may create a survey to determine techniques used by the technician. At 418, the process may provide the survey and the incentives to the technician. At 420, the process may receive the techniques in a response to the survey. At 422, the process may share the techniques with other technicians. For example, in FIG. 1, the machine learning 130 may analyze the behavior of the technician 116 to determine what motivates the technician 116 and predict the incentive(s) 144 that are likely to motivate the technician 116 to provide details of the techniques (e.g., tips and tricks) in the survey answers 158. The machine learning 130 may create the custom survey 148 to determine details associated with the solution, techniques, methods, and the like used to close the case 132 and/or one of the steps 134 quickly. The details of the solution, techniques, methods provided in the survey answers 158 may be provided to other technicians. In this way, all technicians benefit when a particular technician discovers a faster way to perform one of the steps 134 and/or close the case 132, resulting in faster resolution of cases and increased customer satisfaction.

FIG. 5 is a flowchart of a process 500 to train a machine learning algorithm, according to some embodiments. The process 500 may be performed by the server 104 of FIG. 1.

At 502, the machine learning algorithm (e.g., software code) may be created by one or more software designers. At 504, the machine learning algorithm may be trained using pre-classified training data 506. For example, the training data 506 may have been pre-classified by humans, by machine learning, or a combination of both. After the machine learning has been trained using the pre-classified training data 506, the machine learning may be tested, at 508, using test data 510 to determine an accuracy of the machine learning. For example, in the case of a classifier (e.g., support vector machine), the accuracy of the classification may be determined using the test data 510.

If an accuracy of the machine learning does not satisfy a desired accuracy (e.g., 95%, 98%, 99% accurate), at 508, then the machine learning code may be tuned, at 512, to achieve the desired accuracy. For example, at 512, the software designers may modify the machine learning software code to improve the accuracy of the machine learning algorithm. After the machine learning has been tuned, at 512, the machine learning may be retrained, at 504, using the pre-classified training data 506. In this way, 504, 508, 512 may be repeated until the machine learning is able to classify the test data 510 with the desired accuracy.

After determining, at 508, that an accuracy of the machine learning satisfies the desired accuracy, the process may proceed to 514, where verification data for 16 may be used to verify an accuracy of the machine learning. After the accuracy of the machine learning is verified, at 514, the machine learning 130, which has been trained to provide a particular level of accuracy may be used.

The process 500 may be used to train each of multiple machine learning algorithms. For example, in FIG. 1, a first machine learning may be used to determine the incentive(s) 144, a second machine learning may be used to create the custom survey 148, a third machine learning may be used to determine the skills advantage 128, a fourth machine learning may be used to perform the skills-issue correlation 124, a fifth machine learning may be used to perform the issue-solution correlation 126, and so on.

Figure 6:
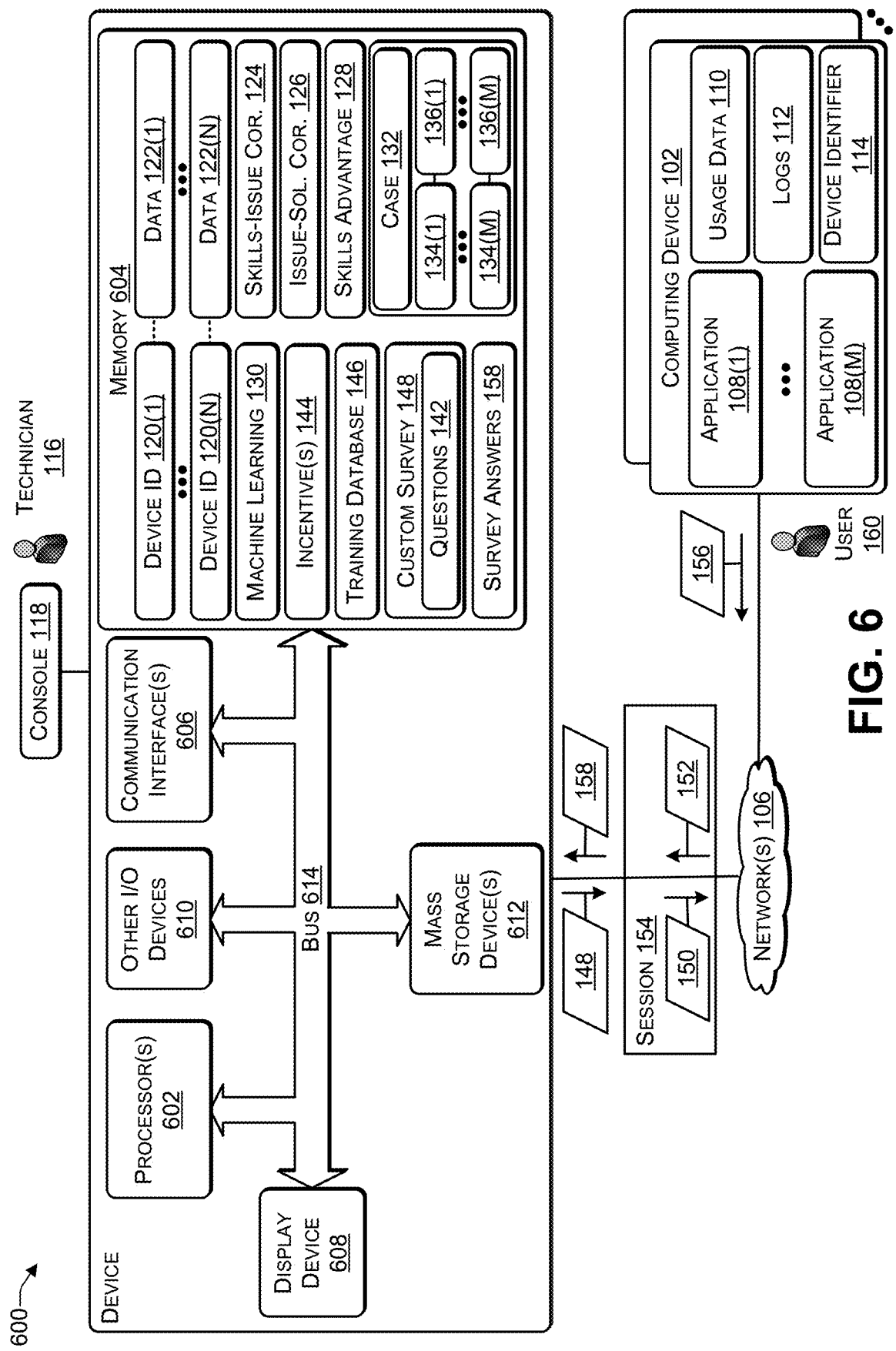
FIG. 6 illustrates an example configuration of a computing device that can be used to implement the systems and techniques described herein.

FIG. 6 illustrates an example configuration of a device 600 that can be used to implement the systems and techniques described herein, such as for example, the computing devices 102 and/or the server 104 of FIG. 1. As an example, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the data 122 associated with a corresponding device identifier 120, the machine learning 130, the NLP 138, the process analysis 140, and the like.

Thus, when the user 160 encounters an issue with the computing device 102, the user 160 may initiate a communication session 154 with a technician 116 that is part of a technical support group of a manufacturer of the computing device 102. The technician 116 may create the case 132 and perform steps 134 to resolve the issue and close the case 132. The server 104 of FIG. 1 (e.g., the device 600) may determine that the case 132, created to address an issue associated with the computing device 102, is closed. The server may perform an analysis of a process that includes the steps 134 used to close the case 132. The server may determine the length of time 136 corresponding to individual steps 134 in the process used to close the case 132. The server may use the machine learning algorithm 130 to predict survey 148 including questions 142 and incentive(s) 144. The server may perform a skills analysis of the technician 116 including: (i) determining a skills gap in the process to close the case 132 and (ii) determining a skills advantage in the process to close the case 132, wherein each step in the skills advantage set of steps took a below average length of time to perform. The average amount of time may be determined based on averaging the time taken by each of multiple technicians associated with the manufacturer of the computing device to complete each step in the process to close a case. The server may schedule training for the technician to address the skills gap set. The machine learning 130 may be used to create a custom technician survey 148 based at least in part on the skills advantage 128, determine. Based on the technician's answers 158 to the custom survey 148, a particular technique that the technician 116 used to perform at least one particular step may be shared with other technicians to enable the other technicians to perform the at least one particular step in the below average amount of time.

Figure 7:
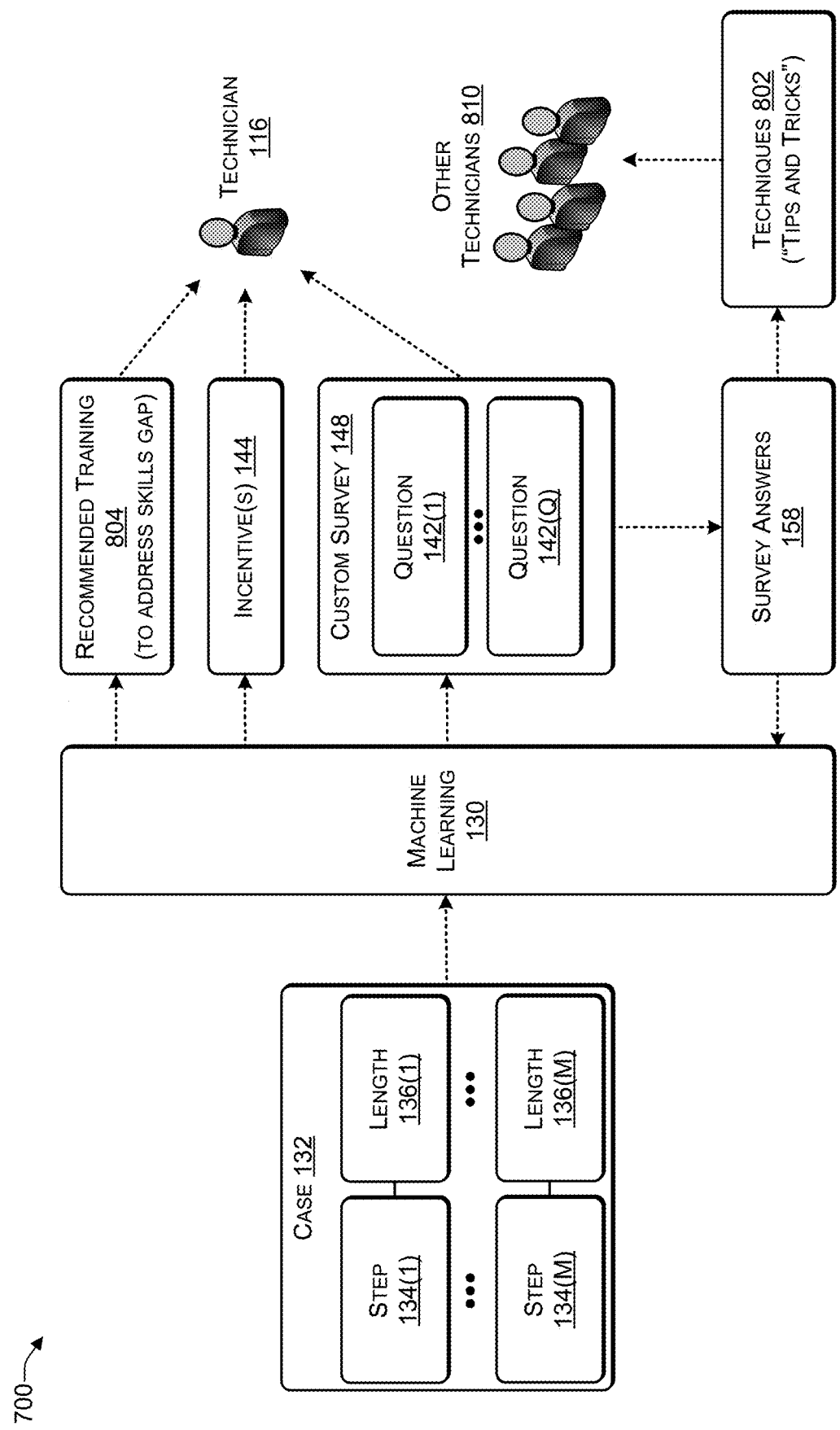
FIG. 7 is a block diagram illustrating determining a type of training to provide a technician, according to some embodiments.

FIG. 7 is a block diagram 700 illustrating determining a type of training to provide a technician, according to some embodiments. The machine learning 130 may analyze the steps 134 used to close the case 132 and determine the length of time 136 associated with each of the steps 134. The machine learning 130 may determine a length of time to close the case 132, e.g., a sum of the lengths 136. If the technician 116 was able to close the case 132 at least a predetermined percentage (or a predetermined amount of time) faster than an average time to close similar cases having similar issues, then the machine learning 130 may create the custom technician survey 802. If the technician 116 was able to complete one or more of the steps 134 at least a predetermined percentage (or a predetermined amount of time) faster than an average time to close the step, then the machine learning 130 may create the custom survey 148. The custom survey 148 may include multiple questions, such as, for example, the question 142(1) to the question 142(Q) (Q>0). The questions 142 may ask the technician 116 regarding techniques 802 the technician 116 used to close the case 132 faster than average and/or complete one or more of the steps 134 faster than average. The machine learning 130 may determine the incentives 144 to motivate the technician 116 to share the techniques 802 in the survey answers 158. The technician 116 may provide the survey answers 158 that include the techniques 802. The techniques 802 may then be shared with other technicians 810 to enable the other technicians 810 to decrease the time to close a case and/or to perform one or more of the steps 134.

If the technician 116 closed the case 132 at least a predetermined percentage (or a predetermined amount of time) slower than average and/or the technician 116 completed one or more of the steps 134 at least a predetermined percentage (or a predetermined amount of time) slower than average time, then the machine learning 130 may create the custom survey 148 to identify which skills the technician 116 may be lacking. The machine learning 130 may use the survey answers 158 to create recommended training 804 to address the skills gap.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by a server associated with a technical support group, that a case created to address an issue associated with a computing device is closed, wherein determining that the created case is closed includes establishing and recording a communications session related to the case, wherein establishing the communications session includes connecting to a client device corresponding to the case, where the client device connection is established via the communications session or another parallel computing session;
    performing, by the server, an analysis of a process used to close the case, the analysis comprising determining a length of time corresponding to individual steps in the process used to close the case based on telemetry information related to the recorded communications session;
    determining, using a machine learning algorithm of one or more Support Vector Machines (SVMs) executed by the server and based at least in part on the analysis, that the case was closed faster than an average case time to close similar cases;
    determining, using the machine learning algorithm and based at least in part on the analysis, that a particular step in the process used to close the case was performed faster than an average step time associated with the particular step;
    generating, using the machine learning algorithm, a second question to include in the custom survey to determine a second technique used to perform the step faster than the average step time;
    after providing the custom survey to the technician, receiving a second answer corresponding to the second question, the second answer including the second technique used to perform the step faster than the average step time;
    providing the second technique used to perform the step faster than the average step time to the one or more additional technicians;

generating, using the machine learning algorithm, a custom survey including a question to determine a technique used to close the case faster than the average case time;
determining, using the machine learning algorithm, one or more incentives to provide to a technique to respond to the custom survey;
providing, by the server, the custom survey to a technician that closed the case faster than the average case time;
identifying, by the server, the one or more incentives to the technician;
receiving, by the server, an answer corresponding to question, the answer including the technique used to close the case faster than the average case time; and
providing, by the server, the technique used to close the case faster than the average case time to one or more additional technicians.

2. The method of claim 1, wherein the analysis of the process used to close the case further comprises:
determining one or more actions performed in the individual steps in the process used to close the case.

3. The method of claim 1, wherein the one or more incentives comprise at least one of:
a cash award;
points redeemable for goods or services; or
an added responsibility of the technician, wherein a job performance of the technician is based at least in part on an evaluation of the added responsibility.

4. The method of claim 1, wherein the analysis of the process used to close the case further comprises performing skills-issue correlation, the skills-issue correlation comprising:
determining an issue associated with the case;
determining one or more skills used to close the case; and
determining a correlation between the one or more skills and skills used by the one or more additional technicians to address similar issues.

5. The method of claim 1, wherein the analysis of the process used to close the case further comprises performing issue-solution correlation, the issue-solution correlation comprising:
determining an issue associated with the case;
determining a solution used to address the issue; and
determining an appropriateness of the solution.

6. The method of claim 1, wherein determining, using the machine learning algorithm executed by the server and based at least in part on the analysis, that the case was closed faster than the average case time to close similar cases comprises:
determining a case time comprising a difference between a first point in time that the case was created to a second point in time that the case was closed;
determining the average case time to close the similar cases; and
determining that the case time is at least a predetermined percentage less than the average case time.

7. A server comprising:
one or more processors; and
one or more non-transitory computer-readable media storing instructions executable by the one or more processors to perform operations comprising:
determining that a case created to address an issue associated with a computing device is closed, wherein determining that the created case is closed includes establishing and recording a communications session related to the case, wherein establishing the communications session includes connecting to a client device corresponding to the case, where the client device connection is established via the communications session or another parallel computing session;
performing an analysis of a process used to close the case, the analysis comprising determining a length of time corresponding to individual steps in the process used to close the case based on telemetry information related to the recorded communications session;
determining, via at least one Support Vector Machine (SVM) and based at least in part on the analysis, that the case was closed faster than an average case time to close similar cases;
determining, using the machine learning algorithm and based at least in part on the analysis, that a particular step in the process used to close the case was performed faster than an average step time associated with the particular step;
generating, using the machine learning algorithm, a second question to include in the custom survey to determine a second technique used to perform the step faster than the average step time;
after providing the custom survey to the technician, receiving a second answer corresponding to the second question, the second answer including the second technique used to perform the step faster than the average step time;
providing the second technique used to perform the step faster than the average step time to the one or more additional technicians;
generating a custom survey including a question to determine a technique used to close the case faster than the average case time;
determining, using the machine learning algorithm, one or more incentives to provide to a technique to respond to the custom survey;
providing the custom survey to a technician that closed the case faster than the average case time;
identifying the one or more incentives to the technician;
receiving an answer corresponding to question, the answer including the technique used to close the case faster than the average case time; and
providing the technique used to close the case faster than the average case time to one or more additional technicians.

8. The server of claim 7, wherein the analysis of the process used to close the case further comprises:
determining one or more actions performed in the individual steps in the process used to close the case.

9. The server of claim 7, wherein the one or more incentives comprise at least one of:
a cash award;
points redeemable for goods or services; or
an added responsibility of the technician, wherein a job performance of the technician is based at least in part on an evaluation of the added responsibility.

10. The server of claim 7, wherein determining, using the machine learning algorithm executed by the server and based at least in part on the analysis, that the case was closed faster than the average case time to close similar cases comprises:
determining a case time comprising a difference between a first point in time that the case was created to a second point in time that the case was closed;
determining the average case time to close the similar cases; and determining that the case time is at least a predetermined percentage less than the average case time.

11. One or more non-transitory computer-readable media storing instructions executable by one or more processors to perform operations comprising:
    determining that a case created to address an issue associated with a computing device is closed, wherein determining that the created case is closed includes establishing and recording a communications session related to the case, wherein establishing the communications session includes connecting to a client device corresponding to the case, where the client device connection is established via the communications session or another parallel computing session;
    performing an analysis of a process used to close the case, the analysis comprising determining a length of time corresponding to individual steps in the process used to close the case based on telemetry information related to the recorded communications session;
    determining, via at least one Support Vector Machine (SVM) and based at least in part on the analysis, that the case was closed faster than an average case time to close similar cases;
    determining, using the machine learning algorithm and based at least in part on the analysis, that a particular step in the process used to close the case was performed faster than an average step time associated with the particular step;
    generating, using the machine learning algorithm, a second question to include in the custom survey to determine a second technique used to perform the step faster than the average step time;
    after providing the custom survey to the technician, receiving a second answer corresponding to the second question, the second answer including the second technique used to perform the step faster than the average step time;
    providing the second technique used to perform the step faster than the average step time to the one or more additional technicians;
    generating a custom survey including a question to determine a technique used to close the case faster than the average case time;
    determining, using the machine learning algorithm, one or more incentives to provide to a technique to respond to the custom survey;
    providing the custom survey to a technician that closed the case faster than the average case time;
    identifying the one or more incentives to the technician;
    receiving an answer corresponding to question, the answer including the technique used to close the case faster than the average case time; and
    providing the technique used to close the case faster than the average case time to one or more additional technicians.

12. The one or more non-transitory computer-readable media of claim 11, wherein the analysis of the process used to close the case further comprises:
    determining one or more actions performed in the individual steps in the process used to close the case.

13. The one or more non-transitory computer-readable media of claim 11, further comprising:
    determining, using the machine learning algorithm and based at least in part on the analysis, that a particular step in the process used to close the case was performed faster than an average step time associated with the particular step;
    generating, using the machine learning algorithm, a second question to include in the custom survey to determine a second technique used to perform the step faster than the average step time;
    after providing the custom survey to the technician, receiving a second answer corresponding to the second question, the second answer including the second technique used to perform the step faster than the average step time; and
    providing the second technique used to perform the step faster than the average step time to the one or more additional technicians.

14. The one or more non-transitory computer-readable media of claim 11, wherein the one or more incentives comprise at least one of:
    a cash award;
    points redeemable for goods or services; or
    an added responsibility of the technician, wherein a job performance of the technician is based at least in part on an evaluation of the added responsibility.

15. The one or more non-transitory computer-readable media of claim 11, wherein the analysis of the process used to close the case further comprises performing skills-issue correlation, the skills-issue correlation comprising:
    determining an issue associated with the case;
    determining one or more skills used to close the case; and
    determining a correlation between the one or more skills and skills used by the one or more additional technicians to address similar issues.

16. The one or more non-transitory computer-readable media of claim 11, wherein the analysis of the process used to close the case further comprises performing issue-solution correlation, the issue-solution correlation comprising:
    determining an issue associated with the case;
    determining a solution used to address the issue; and
    determining an appropriateness of the solution.

17. The one or more non-transitory computer-readable media of claim 11, wherein determining, using the machine learning algorithm executed by the server and based at least in part on the analysis, that the case was closed faster than the average case time to close similar cases comprises:
    determining a case time comprising a difference between a first point in time that the case was created to a second point in time that the case was closed;
    determining the average case time to close the similar cases; and
    determining that the case time is at least a predetermined percentage less than the average case time.

* * * * *